United States Patent Office 2,776,975
Patented Jan. 8, 1957

2,776,975

STABILIZATION OF POLYMERIZABLE HETEROCYCLIC NITROGEN COMPOUNDS

Mack F. Potts, Paul S. Hudson, and Warren L. Smith, Bartlesville, Okla., assignors to Phillips Petroleum Company, a corporation of Delaware No Drawing. Application May 27, 1952,
Serial No. 290,322

12 Claims. (Cl. 260—290)

This invention relates to the stabilization of polymerizable materials. In one of its aspects this invention relates to the stabilization of polymerizable heterocyclic nitrogen compounds under storage and handling conditions and during distillation or at elevated temperatures. In another of its aspects this invention relates to a method for preventing loss of heterocyclic nitrogen compounds due to polymerization.

It is well known that unsaturated, polymerizable heterocyclic nitrogen compounds tend to polymerize during storage and various handling conditions, especially during distillation, and consequently yields and recovery of these compounds are often considerably diminished due to this unwanted and undesirable polymerization. Also, besides reducing yields and recovery of these polymerizable heterocyclic nitrogen compounds, often the polymerized material adversely affects the reactions wherein these polymerizable compounds are employed as reactants, as well as the products which are derived from these reactions.

Accordingly, it is an object of this invention to prevent and/or inhibit the polymerization of polymerizable heterocyclic nitrogen compounds during storage and other handling conditions. It is another object of this invention to inhibit the polymerization of these materials at an elevated temperature and especially during distillation. It is still another object of this invention to provide polymerization inhibited compositions comprising a polymerizable heterocyclic nitrogen compound. It is yet another object of this invention to provide a polymerization inhibited composition comprising a vinyl-substituted pyridine. In at least one embodiment of this invention at least one of these objects will be accomplished.

In accordance with this invention, it has now been found that dinitrohalobenzenes are effective as polymerization inhibitors for polymerizable heterocyclic nitrogen compounds. The dinitrohalobenzenes which are applicable in the practice of this invention include 2,3-dinitrochlorobenzene; 2,4-dinitrochlorobenzene; 2,5-dinitrochlorobenzene; 2,6-dinitrochlorobenzene; 3,4-dinitrochlorobenzene and 3,5-dinitrochlorobenzene as well as the other dinitrohalobenzenes. The dinitrobromobenzenes and the dinitroiodobenzenes are also applicable in the practice of this invention, such as 2,3-dinitrobromobenzene; 2,4-dinitrobromobenzene; 2,4-dinitroiodobenzene; 3,4-dinitrobromobenzene; 2,5-dinitroiodobenzene; 3,5-dinitrobromobenzene; 3,5-dinitroiodobenzene, etc.

These dinitrohalobenzenes are effective as polymerization inhibitors over a wide range of temperatures, from below and about 40° F. up to and above 400° F. The amount of these polymerization-inhibiting dinitrohalobenzenes which need be added to inhibit polymerization usually varies with the amount and type of polymerizable heterocyclic nitrogen compound to be inhibited. Often a trace of these dinitrohalobenzenes is sufficient in the presence of a polymerizable heterocyclic nitrogen compound to inhibit the polymerization of these compounds. Usually an amount of dinitrohalobenzene in the range 0.001 to 5.0% by weight, preferably in the range 0.05 to 1.0% by weight, based on the weight of the polymerizable heterocyclic nitrogen compound, is sufficient. Larger amounts of these dinitrohalobenzenes, even as high as 10% by weight and higher can be used if desired. Although under most circumstances this is not necessary.

The dinitrohalobenzenes, in order to be especially effective, should preferably be in intimate contact with the polymerizable heterocyclic nitrogen compound. If desired, after addition of a dinitrohalobenzene to a polymerizable heterocyclic nitrogen compound, the admixture may be varied to promote dispersion and/or solution of the dinitrohalobenzene therein.

The recovery of these dinitrohalobenzenes from the polymerizable heterocyclic nitrogen compound with which it is admixed is relatively simple and easily effected. After storage, handling or shipment of the stabilized, polymerization-inhibited heterocyclic nitrogen compound, the compound can be easily and readily separated and recovered from the polymerization-inhibiting dinitrohalobenzene, either by distillation, preferably under reduced pressure, or by any other convenient method.

The polymerizable heterocyclic nitrogen compounds which are inhibited against polymerization by a dinitrohalobenzene in accordance with this invention include the polymerizable heterocyclic nitrogen compounds of the pyridine and quinoline (including isoquinoline) series, especially the nuclear (ring) alkyl substituted derivatives thereof. These polymerizable heterocyclic nitrogen compounds include the

substituted nitrogen compounds wherein R is a hydrogen atom or a hydrocarbyl (containing only carbon and hydrogen atoms) radical, preferably having not more than 12 carbon atoms. The vinyl-substituted bases, especially those containing only one substituent vinyl group, as well as the nuclear alkyl substituted derivatives are particularly applicable in the practice of this invention. It is preferred however, that the total number of carbon atoms in the nuclear (ring) substituted alkyl group or groups be not more than twelve. In addition to the vinyl substituted heterocyclic nitrogen compounds the isopropenyl substituted compounds (i. e. a vinyl group having a methyl substituent in the alpha position) can also be inhibited. Typical heterocyclic nitrogen compounds which are applicable in the practice of this invention include the vinyl-substituted pyridines and the vinyl-substituted quinolines. These compounds include the 2-vinylpyridines such as 2-vinylpyridine; 5-methyl-2-vinylpyridine; 5-ethyl-2-vinylpyridine, also the 5-vinylpyridines such as 5-vinylpyridine; 2-methyl-5-vinylpyridine, also the divinylpyridines such as 2,5-divinylpyridine; 3-methyl-2,5-divinylpyridine. Other compounds which are also applicable in the practice of this invention include 4-methyl-3-vinylpyridine, 2-isopropenylpyridine; 5-propyl-2-isopropenylpyridine; 2-octyl-5-vinylpyrodine and the various polymerizable quinoline and isoquinoline compounds such as 2-vinylquinoline, 8-ethyl-2-vinylquinoline; 4-hexyl-5-vinylquinoline; 1-vinylisoquinoline; 5-methyl-1-isopropenylisoquinoline; 1,8-divinylisoquinoline; 2,5,8-trivinylquinoline; 6,7-dimethyl-2,3-divinylquinoline, etc. Generally, and as indicated, any polymerizable, especially vinyl substituted, pyridine, quinoline or isoquinoline is applicable in the practice of this invention.

Other polymerizable heterocyclic nitrogen compounds which can be used in the practice of this invention include the

substituted (as hereinbefore defined) piperidines (hexahydropyridine), pyrroles, pyrrolidines, especially the vinyl-substituted piperidines, pyrroles, pyrrolidines and their alkyl derivatives, as well as the dihydro- and tetrahydropyridines.

As an added feature of this invention it has also been found that the trinitrobenzenes and the trinitrotoluenes are also effective polymerization inhibitors for polymerizable heterocyclic nitrogen compounds. However, it is preferred not to employ these materials as inhibitors since they are explosive and special precautions must be taken when they are employed and handled.

The use of dinitrobenzenes and o-mononitrochlorobenzene as polymerization inhibitors for vinyl-substituted aromatic hydrocarbons, such as styrene, has been known for some time. However, dinitrohalobenzenes, especially 2,4-dinitrochlorobenzene, as a polymerization inhibitor for polymerizable heterocyclic nitrogen compounds is much superior to these materials.

The following example set forth hereinafter is illustrative of this invention and specific details for operating the present invention are described with comparative results, showing the improvements obtained by this invention. However, as indicated this example is merely illustrative and not limitive of this invention.

*Example*

Tests were made on the effectiveness of 2,4-dinitrochlorobenzene, m-dinitrobenzene, o-dinitrobenzene, and o-nitrochlorobenzene as inhibitors for the polymerization of 2-methyl-5-vinylpyridine. The amount of each material employed was 0.3 percent based on the weight of the 2-methyl-5-vinylpyridine. The several mixtures of 2-methyl-5-vinylpyridine and additive were heated at a temperature of 200° F. in an atmosphere of nitrogen for a 24-hour period. The unreacted 2-methyl-5-vinylpyridine was removed by vacuum distillation at a pressure less than 1 mm. Hg. The polymer which remained was weighed and the percent polymerization calculated. The following results were obtained:

| Additive: | Percent polymerization |
| --- | --- |
| 2,4-dinitrochlorobenzene | 2.64 |
| m-Dinitrobenzene | 17.2 |
| o-Dinitrobenzene | 17.7 |
| o-Nitrochlorobenzene | 26.3 |

As will be obvious to those skilled in the art many substitutions, variations and modifications can be made in the light of the foregoing disclosure without departing from the spirit or scope of this disclosure or invention.

We claim:
1. A composition comprising a compound having the formula—

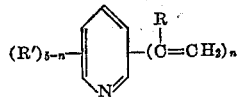

where $n$ is an integer selected from the group consisting of 1 and 2, R is selected from the group consisting of H and CH₃, and R' is selected from the group consisting of H and alkyl groups, not more than 12 carbon atoms being present in the total of said R' groups and a polymerization inhibiting amount of a compound selected from the group consisting of dinitrochlorobenzenes, dinitrobromobenzenes and dinitroiodobenzenes.

2. The composition comprising a compound having the formula—

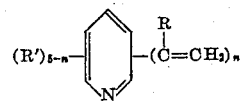

where $n$ is an integer selected from the group consisting of 1 and 2, R is selected from the group consisting of H and CH₃, and R' is selected from the group consisting of H and alkyl groups, not more than 12 carbon atoms being present in the total of said R' groups and a polymerization inhibiting amount of at least about 0.001 percent by weight, based on said compound, of 2,4-dinitrochlorobenzene.

3. A composition comprising a vinyl-substituted pyridine and a polymerization inhibiting amount of a dinitrochlorobenzene.

4. A composition comprising a 2-vinylpyridine and a polymerization inhibiting amount of a dinitrochlorobenzene.

5. A composition comprising 2-vinylpyridine and a polymerization inhibiting amount of 2,4-dinitrochlorobenzene.

6. A composition comprising 2-methyl-5-vinylpyridine and a polymerization inhibiting amount of a dinitrochlorobenzene.

7. A composition comprising 2-methyl-5-vinylpyridine and a polymerization inhibiting amount of 2,4-dinitrochlorobenzene.

8. A composition comprising 2-vinylpyridine and a polymerization inhibiting amount of a dinitrobromobenzene.

9. A composition comprising 2-methyl-5-vinylpyridine and at least 0.001% by weight, based on the 2-methyl-5-vinylpyridine, of a compound selected from the group consisting of dinitrochlorobenzenes, dinitrobromobenzenes and dinitroiodobenzenes.

10. A process for inhibiting the polymerization of a 2-vinyl-substituted pyridine which comprises adding to said pyridine a polymerization inhibiting amount of a dinitrochlorobenzene.

11. A process for inhibiting the polymerization of 2-methyl-5-vinylpyridine which comprises adding to said compound at least about 0.001% by weight, based on said compound, of 2,4-dinitrochlorobenzene.

12. A composition comprising 2-methyl-5-vinylpyridine and between 0.001 and 10% by weight, based on said composition, 2,4-dinitrochlorobenzene.

References Cited in the file of this patent
UNITED STATES PATENTS
2,601,673    McMillan et al. _____ June 24, 1952

OTHER REFERENCES
Schildknecht: Vinyl and Related Polymers (copyright Feb. 20, 1952), pp. 23–27.
Wakefield: Ind. Eng. Chem. 42, 838–41 (1950).
Price: J. Am. Chem. Soc. 65, 757–9 (1943).
Dunbrook et al.: U. S. Pat. Off. Official Gaz., vol. 644, pp. 623–4 (Mar. 13, 1951).